United States Patent
Stöck et al.

[11] Patent Number: 5,879,111
[45] Date of Patent: Mar. 9, 1999

[54] HAND-HELD DEVICE

[75] Inventors: Maximilian Stöck, Azmoos, Switzerland; Ferdinand Kristen, Gilching; Arno Thiel, Uffing, both of Germany

[73] Assignee: Hilti Aktiengesellschaft, Schaan, Liechtenstein

[21] Appl. No.: 967,808

[22] Filed: Nov. 12, 1997

[30] Foreign Application Priority Data

Nov. 11, 1996 [DE] Germany ............ 196 46 382.3

[51] Int. Cl.[6] ...................................... B23B 45/00
[52] U.S. Cl. ..................... 408/6; 408/9; 408/124
[58] Field of Search ................... 408/6, 8, 9, 124

[56] References Cited

U.S. PATENT DOCUMENTS

| | | | |
|---|---|---|---|
| 2,941,414 | 3/1960 | Lee | 408/139 |
| 3,135,137 | 6/1964 | Cunningham | 408/124 |
| 3,649,129 | 3/1972 | King | 408/139 |
| 4,085,337 | 4/1978 | Moeller | 408/124 |
| 4,090,802 | 5/1978 | Bilz | 408/6 |
| 5,155,473 | 10/1992 | Oketani et al. | 408/6 |
| 5,584,619 | 12/1996 | Guzzella | 408/6 |

Primary Examiner—Daniel W. Howell
Assistant Examiner—Rouzbeh Tabaddor
Attorney, Agent, or Firm—Anderson, Kill & Olick, P.C.

[57] ABSTRACT

A motor-operated hand-held device (1), such as a drilling device, has a rotary spindle (6) located within and projecting out of a housing (2). Rotational movement of a driving motor (8) is transmitted to a tool (7) secured to the end of the rotary spindle (6). A safety device (11) within the housing (2) prevents a deflection of the housing about an axis (A) of the rotary spindle (6) in the event the tool (7) becomes suddenly jammed. The safety device (11) can be activated by a detection device (12) if the tool (7) becomes jammed. An overload slip clutch (10) is provided in the drive (9) between the driving motor (8) and the rotary spindle (6). The safety device (11) is arranged in series with the overload slip clutch (10) and is located in the drive (9) adjacent the overload slip clutch (10). When activated, the safety device (11) couples the housing (2) with the drive (9) for the rotary spindle so that the housing (2) and the drive (9) are fixed with respect to rotation relative to one another.

8 Claims, 3 Drawing Sheets

HAND-HELD DEVICE

BACKGROUND OF THE INVENTION

The present invention is directed to a motor-operated hand-held device, such as a drilling device, including a housing with a rotary spindle located in the housing and projecting out of it for transmitting rotational movement from a driving motor to a tool secured to the rotary spindle. A safety device is provided for preventing deflection of the housing of the hand-held device about the axis of the rotary spindle if the tool suddenly becomes locked or jammed. The safety device can be activated by a detection device in the event the tool becomes jammed.

Hand held devices of the generic type such as drilling devices or cutting and grinding devices are used primarily by professional craftsmen but also to an increasing degree by nonprofessionals for home use. Operation of such hand-held devices entails the risk that the tool held in the rotary spindle will become jammed as the result of improper operation on the part of the operator or user or, for example, when striking reinforcing steel while drilling holes in reinforced concrete. The sudden locking of the rotary spindle causes high reaction torques which lead to a deflection of the housing about the rotary spindle axis. Normally the tool operator is unprepared for such a reaction and is taken by surprise by the deflection of the hand held device and may lose his grip on the device, or, when working at elevated positions, such as on scaffolds and ladders, can lose his balance and fall which could result in injury.

To avoid such situations, in the past various steps have been proposed using the principle of an inert mass to insure that the housing and the jammed tool are coupled so as to be fixed with respect to rotation relative to one another when the hand-held device is deflected. An example of such a solution is found in DE-A-43 00 021. In the hand-held device described in this patent publication, a mechanical locking bar is proposed which is connected with the housing for blocking the rotary spindle by a positive engagement, with the mechanical locking bar being activated via an inert mass in the event of a sudden deflection of the hand-held device. Safety devices based on the principle of an inert mass are only activated by the jolting or jerking deflection of the housing. As a result, relatively large deflection angles can develop in hand-held devices using the safety device of this kind which acts in a purely mechanical manner.

In EP-D-0 486 843 a hand-held device is disclosed outfitted with loop spring couplings in the drive for the rotary spindle and includes a safety device cooperating with a detection device in the event the tool becomes jammed. The safety device is an additional loop spring coupling which can be electronically activated when jamming is detected and prevents rotation about a drive shaft by means of a brake spring. Accordingly, the safety device in this known hand-held device is not activated by a relatively slowly reacting inert mass. Instead, an electronic signal is generated when jamming is detected and the electronic signal causes current to be supplied to a magnet coil forming a component of an electromagnetic brake. The electromagnetic brake cooperates with a switching housing which results in a compression of the loop spring coupling and to a coupling of the drive shaft and the housing, so that they are fixed relative to one another with respect to relative rotation. This safety device is relatively complicated with respect to its construction and is designed only for hand-held devices outfitted with loop spring couplings in the drive for the rotary spindle. The loop spring is arranged at a distance from the drive shaft under normal operating conditions. When jamming occurs, this distance must be bridged for coupling the housing and the drive shaft, so that they are fixed with respect to rotation relative to one another. This feature causes a certain delay in the response of the safety device which can result in a deflection angle of the hand-held device unacceptable to the user.

SUMMARY OF THE INVENTION

Therefore, it is the primary object of the present invention to provide a hand-held device containing a safety device, so that, when jamming occurs, deflection angles of the hand-held device are prevented which are unacceptable for the safety of the user. The safety device has a very fast response characteristic and is simple in its construction. In particular, the hand-held device contains a safety device used in combination with a detection device for prompt detection of jamming and which can be activated by the detection device. Further, the driving motor is treated carefully when a jamming of the tool occurs. Moreover, the hand-held device is sufficiently safe for the user when only a limited deflection at small swiveling angles is possible due to spatial factors, for example, when drilling in corners where the hand-held device rests against a wall.

In accordance with the invention, the motor-operated hand held device, such as a drilling device, has a rotary spindle located within and projecting out of a housing and serving to transmit rotational movement from a driving motor to a tool and includes a safety device for preventing deflection of the housing of the hand-held device about the axis of the rotary spindle in the event the tool is suddenly jammed. The safety device can be activated by a detection device in the event the tool is jammed. An overload slip clutch is provided in the drive for the rotary spindle. The safety device is arranged in series with an overload slip clutch with the safety device located between the slip clutch and the rotary spindle, and when activated, couples the housing with the drive for the rotary spindle so that the housing and the drive are fixed with respect to rotation relative to one another.

The arrangement, according to the invention, of the safety device in the drive for the rotary spindle is located adjacent to the overload slip clutch and spaced from the rotary spindle having the advantage that in this region of the drive, owing to the transmission-like gear reduction ratios, the torques to be overcome by the safety device in the event of jamming of the rotary spindle are relatively small. The safety device is positioned in a region of the drive with relatively small dimensions. As a result, the distances to be bridged by the safety device for coupling the housing and the drive for the rotary spindle are fixed with respect to rotation relative to one another when the jamming of the tool is detected are also relatively small. On one hand, the overload slip clutch serves to protect the driving motor, especially if the tool is jammed. In addition, the arrangement of the overload slip clutch in the drive for the rotary spindle offers the user or operator additional protection, for example, when the hand-held device cannot deflect in the case of jamming because of spatial factors and the detection device which determines the occurrence of jamming based on the measurement of rotational or angular accelerations, does not respond. In such a case, the safety device does not receive any control signal, and is therefore not activated. Instead, the overload slip clutch responds at a determined torque and severs the drive between the driving motor and the rotary spindle.

Advantageously, the safety device can be activated electromechanically to provide the greatest possible safety for the user and to ensure a dependable response of the safety device if the tool is jammed.

The safety device includes a spring-loaded thrust element coupling the housing with the drive such that they are fixed with respect to rotation relative to one another when the hand-held device is switched off, activation of the safety device is ensured in the event of a failure of the hand-held device that leads to a sudden switching off of the drive to the rotary spindle.

In a preferred embodiment of the invention, the spring-loaded thrust element is located in the magnetic field of a magnet coil supplied with current during operation of the device, and the current is switched off when jamming is detected so that the safety device can be activated. In this case, the activation of the safety device is reduced to the automatic actuation of the switching arrangement for supplying current to the magnetic coil. For this purpose the thrust element, which is held back in the magnetic field against spring force, is automatically released to provide coupling of the housing and the drive for the rotary spindle so that the drive and the housing are fixed with rotation relative to one another. The safety device is also automatically activated by the selected arrangement in the event of a power outage.

In another embodiment of the hand-held device according to the invention, the safety device is constructed so that it produces a positive engagement between the housing and the drive. Further, it is formed of at least two locking elements cooperating with one another in a positive engagement when activated, with one of the locking elements connected to the housing and the other locking element connected to the drive. Due to the transmission-like gear reduction ratios, the torques to be absorbed by the locking elements which cooperate in a positive engagement are relatively small. Often, the locking elements can be made relatively light weight which benefits the response time of the safety device. The thrust element forming one of the locking elements engages in the teeth of a shaft segment in the drive for the rotary spindle, when the tool is jammed, and couples the housing with the drive. Overloading of the driving motor is prevented by the overload slip clutch.

In still another preferred embodiment of the hand-held device according to the invention, the safety device is arranged to provide a frictional connection between the housing and the drive. Preferably, in this arrangement, at least one brake shoe is associated with the housing and cooperates in a frictional engagement with a shaft of the drive when jamming of the tool occurs. The response characteristic of the safety device utilizing frictional engagement substantially depends upon the spring force by which the thrust element, on which the brake shoe is preferably arranged, is pretensioned in the direction of the shaft to be braked. In this embodiment of the hand-held device according to the invention, the pretensioning force on the thrust element can be changed depending on the application. The brake shoe is preferably replaceable. The response characteristic of the safety device is influenced by the selection of a brake shoe with suitable frictional properties.

In an advantageous variation of the invention, the curvature of the friction surface of the brake shoe is adapted to curvature of the surface of the shaft to be braked. When the safety device is activated, a surface-area contact occurs between the braking surface of the brake shoe and the surface of the shaft whereby the friction force is increased.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there are illustrated and described preferred embodiments of the invention.

DETAILED DESCRIPTION OF THE INVENTION

Figure 1:
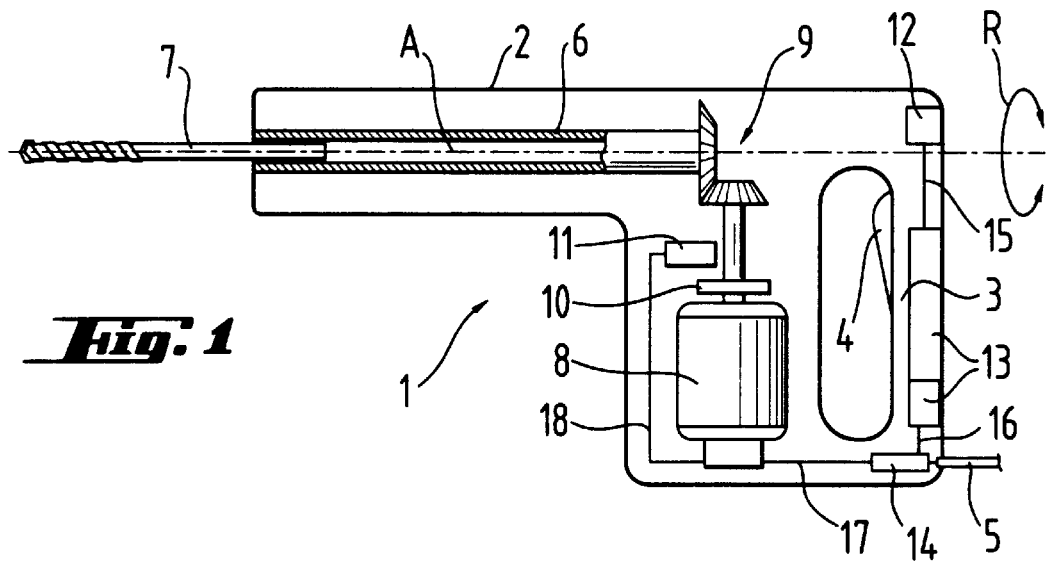
FIG. 1 is a schematic illustration of a hand-held device, embodying the invention, where the hand-held device is a drilling device.

In the schematic illustration in FIG. 1, a hand-held device 1 is shown. The hand-held device 1 is a drilling device. Drilling devices of the generic type normally have a hammer mechanism for directing axial blows to the tool during operation. For the sake of simplicity, the hammer mechanism is not shown in FIG. 1. The hand-held device 1 includes a housing 2, conventionally formed of plastic, with a handle part 3 at one end. The hand-held device is supplied with power via a cable 5. The switch 4 in the handle part 3 serves to place the hand-held device in operation. An axially extending rotary spindle 6 is located in the housing and projects out of the housing 2 at the opposite end from the handle part and serves to receive a tool, such as a drilling tool, which is driven by the rotary spindle 6. The rotary spindle is connected via a drive 9 or a gear arrangement with a driving motor 8. The drive 9 transmits the rotational movement of the driving motor to the rotary spindle 6 and the tool 7. Rotation of the rotary spindle 6 about the axis A is represented in FIG. 1 by a double arrow R to illustrate the possibility of both clockwise and counter-clockwise running of the rotary spindle as is selectable in many hand-held devices.

Within the housing 2, the hand-held device 1 has a detection device for prompt detection of situations endangering the user or operator as a result of tool jamming. The detection device comprises sensors which detect a deflection of the hand-held device 1 about the axis of rotation A of the rotary spindle 6. The detected measurement values are digitized and sent to an evaluating unit 13 with memory or storage unit and computing units, for example, a microprocessor. The measured values are converted in the evaluating unit 13 into characteristic values or parameters of the rotational movement, for example, angular acceleration, rotating speed and deflecting angle. Based on these parameters, the anticipated degree of risk for the user is calculated according to presettable criteria, for example, by determining the anticipated deflection angle or the probability of a mishap. The values determined in the evaluating unit 13 are fed to a comparison unit 14 which generates a signal when a preferably presettable threshold value is exceeded. On one hand, the signal is fed to the driving motor to switch off the driving motor automatically when an impermissibly high degree of risk to the user is detected. On the other hand, the signal generated by the comparison unit activates the safety device 11 provided in the drive 9 for the rotary spindle. Accordingly, the safety device cooperates with the detection device whereby it is activated depending on the measured values detected by the sensors of the detection device and processed by the evaluating unit 13. The safety device 11 suppresses the deflecting movement of the housing 2 about the axis of rotation A of the rotary spindle 6 whereby the housing and the rotary spindle 6, blocked by the tool 7, are coupled together and fixed with respect to relative rotation.

The safety device 11 is located in the drive 9 in between the overload slip clutch 10 and the rotary spindle 6. The series arrangement of the safety device 11, which can be activated automatically by the detection device 12 and the overload slip clutch 10 in the drive 9 for the rotary spindle 6 offers the user the greatest possible degree of protection and prevents dangerous situations in which the user could be startled by high reaction torques. The detection device 12, the evaluating unit 13, the comparison unit 14, the driving motor 8 and the safety device 11 are interconnected by signal lines 15, 16, 17 and 18.

Figure 2:
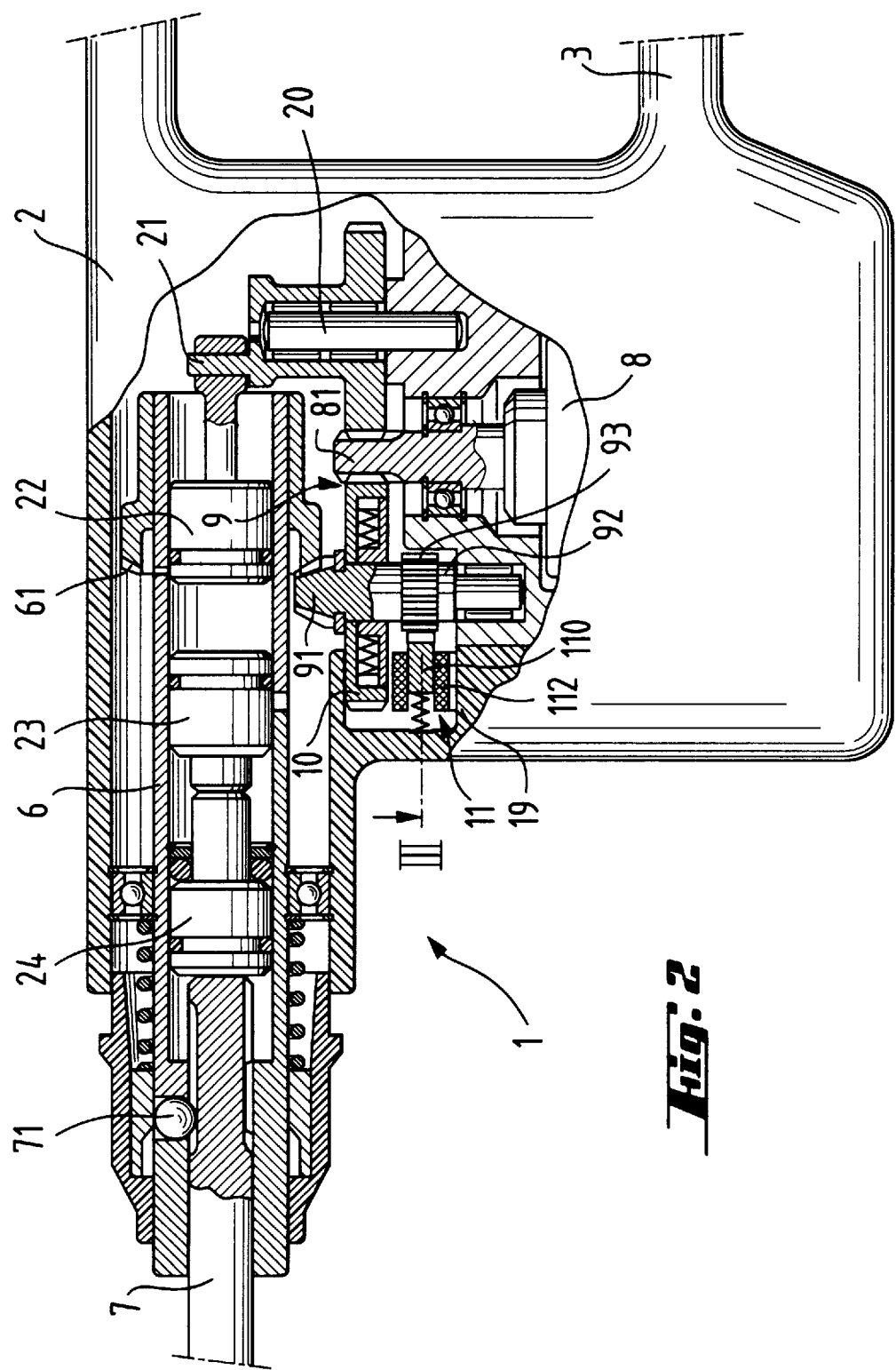
FIG. 2 is a side elevational view, partly in section, of a first embodiment of the safety device.

In FIG. 2 the hand-held device 1 is shown partly in section. This hand-held device 1 is a hammer-drill device outfitted with an hammer mechanism which, during operation, applies axially directed blows to the drilling tool 7 inserted into a tool holder or chuck 71. The tool holder is arranged in axial alignment with the rotary spindle 6 and is connected with the rotary spindle so that it is fixed with respect to rotation relative to the spindle. The rotary spindle 6 is driven by the driving motor 8 via a drive or gear arrangement 9. In this arrangement, the teeth of a motor shaft 81 engages the teeth of the overload slip clutch 10, whose driving output or power take-off part is connected with a shaft 92 so as to be fixed with respect to rotation relative to it. Shaft 9 is supported in a support plate 19 located within the housing 2 and carrying a conical gear wheel or bevel gear 91. The bevel gear 91 engages in teeth of a wheel 61 mounted on and fixed to the rotary spindle so that they rotate together and transmit the rotating movement of the shaft 92 to the rotary spindle 6.

The motor shaft 81 also drives an upright drive shaft 20 of the hammer mechanism. A pin mounted eccentrically at the front end of the shaft 20 is connected with an exciter piston 22 of the hammer mechanism guided in the hollow rotary spindle 6. Since the exciter piston 22 is articulated eccentrically by the shaft 20, the rotation of the drive shaft 20 is translated into a reciprocating movement of the exciter piston in the interior of the rotary spindle 6. The exciter piston 22 cooperates with a flying piston 23 located ahead of it within the rotary spindle 6 so that the flying piston is reciprocally axially displaceable in the spindle 6. An air cushion is formed between the exciter piston 22 and the flying piston 23 preventing the two pistons from colliding. During operation, the flying piston 23 strikes against an anvil member 24 which projects into the tool holder and transmits the axial hammer blows to the tool 7.

Figure 3:
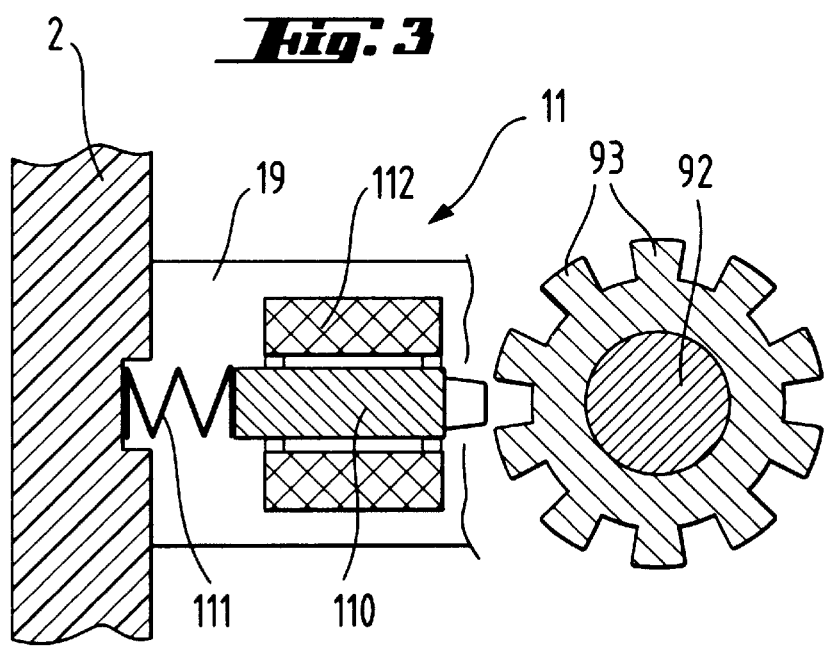
FIG. 3 is an elevational view partly in section and on an enlarged scale, of the safety device in FIG. 2 taken along the line III.

To prevent a sudden deflection of the housing 2 of the hand-held device 1 in the event the tool 7 becomes jammed, the safety device 11 is arranged adjacent the overload slip clutch 7 in the drive 9 of the rotary spindle 6. As illustrated in FIG. 3, the safety device 11 comprises a thrust element 110 pretensioned by a spring 111 in the direction of brake teeth 93 on the shaft 92. The spring-loaded thrust element is guided a magnet coil 112 and is displaceable axially toward the shaft 92. The magnet coil 112 is mounted on a support plate 19 connected to the housing 2.

Under normal conditions, the spring loaded thrust element 110 is spaced outwardly from the brake teeth 93 of the shaft by the magnetic field of the magnet coil 112. When the safety device 11 is activated, after jamming is detected, the current of the magnet coil 112 is switched off by signal. Accordingly, the thrust element 110 is pressed against the brake teeth 92 of the shaft 92 by the spring 111 until its front end slides between the brake teeth 93. In this manner, the housing 2 and the shaft 92 are coupled with one another by positive engagement so that they are fixed with respect to rotation relative to one another. Since the tool 7 is jammed, the rotary spindle 6 is also locked. Accordingly, the bevel gear 91 connected to the shaft 92 is fixed with respect to rotation relative to it and is also locked. Thus, when the tool jammed, a connection is produced between the housing 2 and the jammed tool 7 so that they are fixed with respect to rotation relative to one another. The housing 2 can no longer be deflected. Due to the fact that the entire mass of the hand-held device 1 is coupled with the tool 7 and fixed with respect to rotation relative to it when jamming occurs, the tool can also be freed again and the drilling process continued without interruption.

Figure 4:
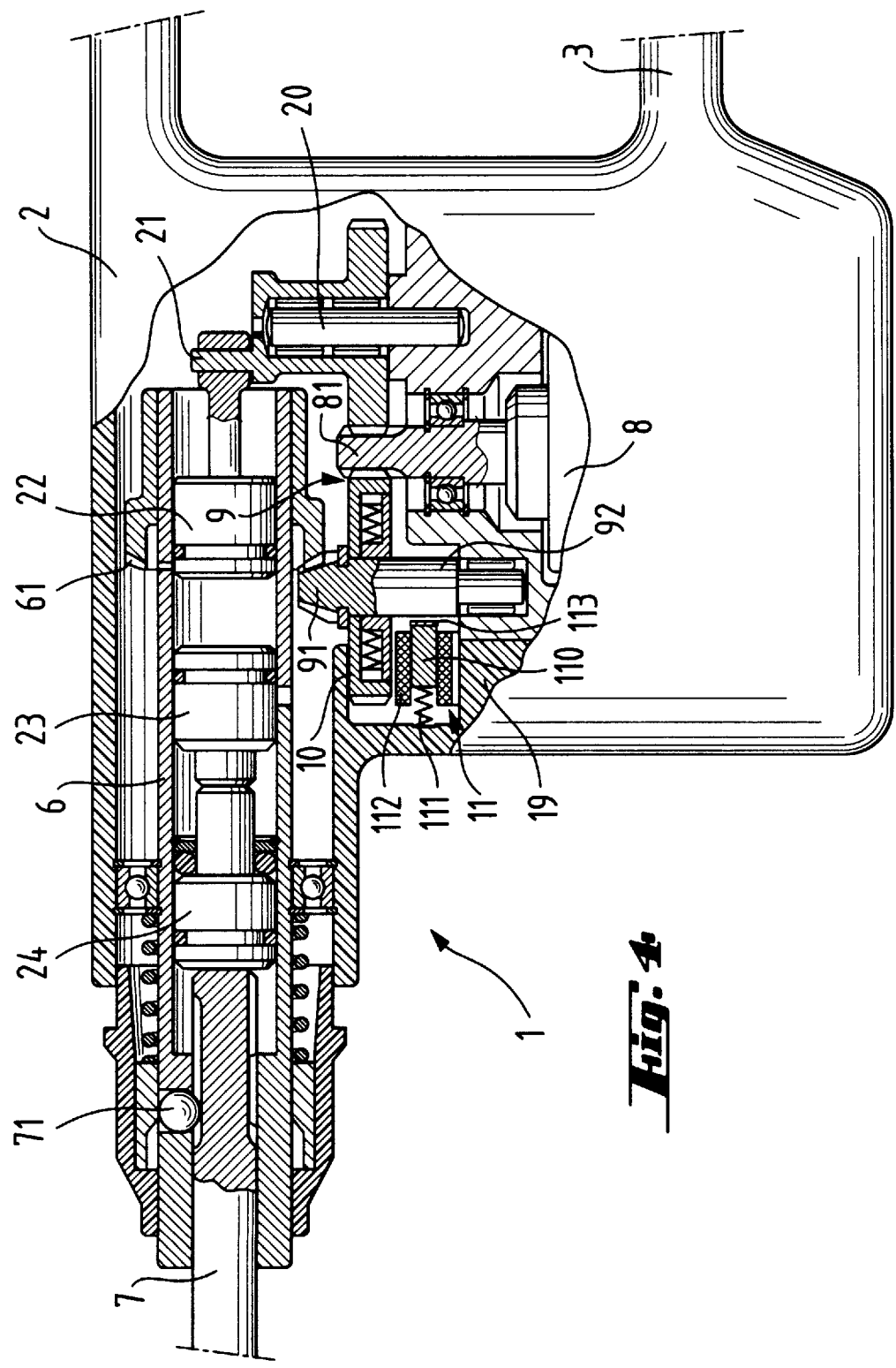
FIG. 4 is a view similar to FIG. 2 displaying another embodiment of the safety device.

In FIG. 4 a hand-held device contains another variation of the safety device 11. In FIG. 4, the safety device includes a thrust element 110 pretensioned towards the shaft 92 by a spring 111 and is axially displaceable in the magnetic field of a magnet coil 112. The thrust element 110 has a brake shoe 113 at its inner end facing the surface of the shaft 92. The brake shoe 113 has a brake lining. Under normal operating conditions, the thrust element are spaced a distance from the shaft 92 by the magnetic field of the magnet coil 112. When a possible case of jamming is detected, a signal generated which interrupts the circuit to the magnetic coil 112. The magnetic field of the magnet coil 112 collapses and the thrust element, including the brake shoe 113, is pressed inwardly against the surface of the shaft 92. The brake lining on the brake shoe 113 has a high friction coefficient relative to the surface, so that the housing 2 is coupled with the locked shaft 92 by a frictional engagement. Preferably, the brake shoe 113 is adapted to the curvature of the shaft 92. The brake shoe 113 and its brake lining can be formed on the thrust element 110 so that they can be replaced.

The safety device 11 is activated via the detection device 12 which also cooperates with the driving motor 8. At the same time that the safety device 11 is activated, the driving motor 8 is switched off. The residual torque of the driving motor 8 is received by the overload slip clutch 10 which separates the drive 9 from the driving motor 8. When the hand-held device 1 is placed in operation again after the tool 7 is released, the original state is restored and the coupling of the housing 2 with the shaft 92, where they are fixed with respect to rotation relative to one another, is cancelled in that current is supplied to the magnet coil 112. In this way, the hand-held device is prepared for the eventuality of another jamming of the tool 7 whereby the user is afforded the greatest possible protection.

While specific embodiments of the invention have been shown and described in detail to illustrate the inventive principles, it will be understood that the invention may be embodied otherwise without departing from such principles.

What is claimed is:

1. Motor operated hand-held device comprising a housing (2), an axially extending rotary spindle (6) mounted in and projecting out of said housing (2) for transmitting rotational movement from a driving motor (8) located in said housing to a tool (7), said rotary spindle (6) and said tool (7) having a common axis (A), a safety device (11) located within said housing (2) for preventing a deflection of said housing (2)

about the axis (A) of said rotary spindle (6) in the event during operation of said hand-held device said tool (7) becomes suddenly jammed, a detection device (12) in said housing (2) for activating said safety device (11) in the event said tool (7) is jammed, an overload slip clutch (10) positioned upstream of a means (9) for conveying the driving action of said driving motor (8) to said rotary spindle (6), said safety device (11) arranged adjacent said overhead slip clutch (10), and when said safety device is activated, the safety device couples said housing with said means (9) for driving said rotary spindle so that said housing (2) and said means (9) are fixed with respect to rotation relative to one another.

2. Motor-operated hand-held device as set forth in claim 1, wherein said safety device (11) is activated electro-mechanically when jamming of said tool (7) is detected.

3. Motor-operated hand-held device, as set forth in claim 2, wherein said safety device (11) comprises a spring-loaded thrust element (110) which, when said hand-held device is switched off, couples the housing (2) with the means (9) so that they are fixed with respect to rotation relative to one another.

4. Motor-operated hand-held device, as set forth in claim 3, wherein said spring-loaded thrust element (110) is positioned in a magnetic field of a magnet coil (112) supplied with current during operation of said hand-held device and which current is switched off when jamming of the tool (7) is detected and the safety device (11) is activated.

5. Motor-operated hand-held device, as set forth in claims 1, 2, 3 or 4, wherein said safety device (11) provides a positive engagement between said housing (2) and said means (9) for driving said rotary spindle (16) and comprises at least two locking elements (110, 93) cooperating with one another in a positive engagement when said safety device is activated, and one of said locking elements being connected with said housing (2), and the other said locking element forming a part of said means (9) for driving said rotary spindle (6).

6. Motor-operated hand-held device, as set forth in claims 1, 2, 3 or 4, wherein said safety device (11), when activated, provides a frictional connection between said housing (2) and said means (9) for driving said rotary spindle (6) and comprises at least one brake shoe (113) associated with said housing (2) and arranged for frictional engagement with a rotating shaft (92) of said means (9) when jamming of said tool (7) takes place.

7. Motor-operated hand-held device, as set forth in claim 6, wherein said brake shoe (11) has a curved friction surface corresponding to a curvature of a surface of said shaft (92).

8. Motor-operated hand-held device, as set forth in claim 6, wherein said brake shoe (113) is replaceable.

* * * * *